United States Patent
Jeroense et al.

(10) Patent No.: US 8,816,206 B2
(45) Date of Patent: Aug. 26, 2014

(54) ELECTRIC POWER CABLE, AN OFF-SHORE INSTALLATION PROVIDED THEREWITH, AND USE THEREOF

(75) Inventors: Marc Jeroense, Karlskrona (SE); Claes Sonesson, Rödeby (SE)

(73) Assignee: ABB Technology Ltd., Zürich (CH)

( * ) Notice: Subject to any disclaimer, the term of this patent is extended or adjusted under 35 U.S.C. 154(b) by 726 days.

(21) Appl. No.: 12/519,296

(22) PCT Filed: Dec. 13, 2007

(86) PCT No.: PCT/EP2007/063858
§ 371 (c)(1),
(2), (4) Date: Jun. 15, 2009

(87) PCT Pub. No.: WO2008/071754
PCT Pub. Date: Jun. 19, 2008

(65) Prior Publication Data
US 2010/0025071 A1    Feb. 4, 2010

(30) Foreign Application Priority Data

Dec. 15, 2006 (EP) .................... 06126240

(51) Int. Cl.
*H01B 3/30* (2006.01)
(52) U.S. Cl.
USPC .................................................. 174/106 R
(58) Field of Classification Search
USPC ................ 174/102 R, 106 R, 113 R
See application file for complete search history.

(56) References Cited

U.S. PATENT DOCUMENTS

| | | | | | |
|---|---|---|---|---|---|
| 2,375,067 | A | * | 5/1945 | Bennett | 174/25 R |
| 2,576,163 | A | * | 11/1951 | Baguley et al. | 174/28 |
| 2,662,931 | A | * | 12/1953 | Mougey | 174/106 R |
| 2,709,197 | A | * | 5/1955 | Davey | 174/25 R |
| 3,803,339 | A | * | 4/1974 | Speekman | 174/23 C |
| 4,360,704 | A | * | 11/1982 | Madry | 174/36 |
| 4,520,230 | A | * | 5/1985 | Uesugi et al. | 174/107 |
| 4,780,574 | A | | 10/1988 | Neuroth | |
| 6,538,198 | B1 | * | 3/2003 | Wooters | 174/47 |

(Continued)

FOREIGN PATENT DOCUMENTS

| | | |
|---|---|---|
| CN | 2817005 Y | 9/2006 |
| EP | 0938102 A2 | 8/1999 |

(Continued)

OTHER PUBLICATIONS

PCT/ISA/210—International Search Report—Apr. 11, 2008.

(Continued)

*Primary Examiner* — Chau N Nguyen
(74) *Attorney, Agent, or Firm* — Venable LLP; Eric J. Franklin

(57) ABSTRACT

An electric power cable including at least one electric conductor. An electric insulation surround the conductor and includes a polymer. A tubular protective sheath surrounds the electric insulation and acts as a water barrier that prevents water intrusion into the electric insulation. The protective sheath includes a metal as a main constituent. The cable includes at least one density-raising element of a material of higher density than the material of the protective sheath, in order to increase the density of the cable such that too large motions thereof are prevented when the latter is installed in open sea.

11 Claims, 4 Drawing Sheets

(56) References Cited

U.S. PATENT DOCUMENTS 6,803,517 B2 * 10/2004 Caimi ........................ 174/36
7,049,506 B2 * 5/2006 Head ........................ 174/36
2006/0272845 A1 * 12/2006 Galey et al. ............. 174/105 R

FOREIGN PATENT DOCUMENTS

| GB | 2361652 A | 10/2001 |
| JP | 08077842 A | 3/1996 |
| JP | 09320353 A | 12/1997 |

OTHER PUBLICATIONS

PCT/ISA/237—Written Opinion of the International Searching Authority—Apr. 11, 2008.
PCT/IPEA/409—International Preliminary Report on Patentability—Feb. 11, 2009.
Rejection Decison Issued in Chinese Counterpart Application No. 200780046152.3 (With English Translation).
Notification of Second Office Action Issued in Chinese Counterpart Application No. 200780046152.3 (With English Translation).

* cited by examiner

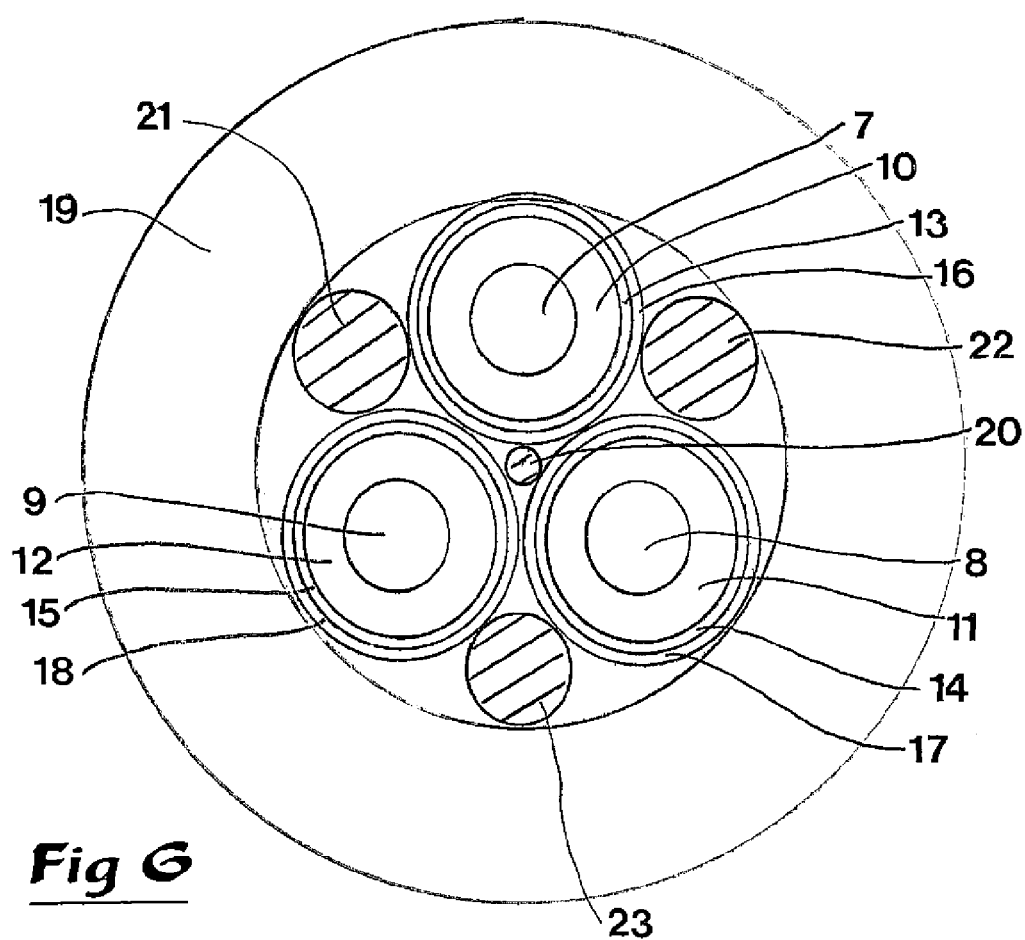
Fig G

ELECTRIC POWER CABLE, AN OFF-SHORE INSTALLATION PROVIDED THEREWITH, AND USE THEREOF

CROSS-REFERENCE TO RELATED APPLICATIONS

This application claims priority to U.S. provisional patent application 06126240.8 filed 15 Dec. 2006 is the national phase under 35 U.S.C. §371 of PCT/EP2007/063858 filed 13 Dec. 2007.

TECHNICAL FIELD

The present invention relates to an electric power cable, comprising: at least one electric conductor, an electric insulation surrounding said conductor and comprising a polymer, a tubular protective sheath surrounding said electric insulation and acting as a water barrier that prevents water intrusion into the electric insulation, wherein said protective sheath comprises a metal as a main constituent.

The present invention also relates to an off-shore installation provided with such an electric power cable extending freely in the sea between two fixing points, for example between an off-shore platform and the sea bottom, or between individual vessels or off-shore platforms.

The invention also relates to the use of such an electric power cable in connection to an off-shore installation, wherein said cable is permitted to extend freely in the sea between two fixing points.

In this context it should be understood that "off-shore installations" may include floating platforms, platforms standing on the sea bottom, as well as floating vessels. Platforms are primarily, but not necessarily, referred to as platforms by means of which oil or gas is exploited from sub-sea wells.

Typically, the electric power cable will be used to transmit electric power of medium or high voltage, wherein medium voltage is referred to as from about 1 kV up to about 40 kV, while high voltage is referred to as from about 40 kV up to about 300 kV or even above that figure. The inventive cable may be used for either AC or DC power.

BACKGROUND OF THE INVENTION

Dynamic sub-sea cables are power cables that may be connected to, for example, floating platforms by means of which oil and/or gas is exploited from sub-sea wells. These cables may be freely extending in the sea water between certain fixing points, for example the platform and the sea bottom, and will therefore be moving with the motions of the sea, including sea currents and wind-induced motions. All materials but specifically the metals in such a cable are set out for mechanical fatigue due to these movements. Certain materials present a lower fatigue strength and will, therefore, possibly crack if subjected to a certain degree of fatigue strain. Especially the lead sheath, an often used barrier in subsea cables, is sensitive to fatigue and will eventually crack after too many or to large movements. Still, water ingress is not accepted by the cable and oil/gas industry. For that reason, lead might not be the best choice as water barrier material when it comes to dynamic power cables that are supposed to be freely moving in the sea.

Welded, soldered or glued copper sheaths perform better than corresponding lead sheaths with respect to mechanical fatigue. However, the density of copper is much less than that of lead, and as a result thereof cables using a copper sheath will be less dense than corresponding cables that use a sheath made of lead. In other words, the weight/diameter ratio of the copper sheath cable will be less than the weight/diameter ratio of a corresponding lead sheath cable. The applicant has realised that, for cables that are supposed to move freely and dynamically in open sea water, a too low cable density may be a drawback since such a cable might move too much and too easily when subjected to the motions of the sea. A well-designed cable should be able to follow the motions of the waves and the sea currents in such a way that its movement do not become so large that there might be a chance of getting a natural frequency behaviour of said cable.

THE OBJECT OF THE INVENTION

It is an object of the present invention to present an electric power cable that permits the use of relatively light-weight materials of high fatigue strength as main constituents of the water-barrier sheath, and at the same time present a cable the properties of which are such that they prevent it from being too much affected by sea motions, thereby preventing too large cable motions when the latter is installed in open sea.

It is also an object to present such an electric power cable that is well suited for economically feasible manufacture thereof.

SUMMARY OF THE INVENTION

The object of the invention is achieved by means of the initially defined electric power cable, characterised in that said cable comprises at least one density-raising element of a material of higher density than the material of the protective sheath, in order to increase the density of said cable such that too large motions thereof are prevented when the latter is installed in open sea. It is assumed that the protective sheath has a density that is higher than the total density of the cable, excluding the density-raising element. However, should this not be the case, the density of the density-raising element is at least higher than the total density of the cable. By adding such a density-raising element to the cable, a cable less prone to follow the motions of the sea will be obtained.

According to one embodiment, said at least one density-raising element comprises a metal, preferably lead, as a main constituent. However, other materials may be conceived, depending on the specific operation conditions of the cable when in use, and depending on the density of the rest of the cable.

According to one embodiment, said protective sheath comprises a metal, preferably copper, as a main constituent.

According to an alternative embodiment said protective sheath comprises steel as a main constituent.

According to one embodiment, said at least one density-raising element comprises a tubular element. Preferably, the density-raising element is also continuous in the longitudinal direction of the cable. At the time being, this is assumed to be a preferred embodiment. However, alternative designs, such as non-continuous elements or elements with shapes other than that of a tube might be conceived, for example helical windings that, continuously or non-continuously, extends in the longitudinal direction of the cable. Preferably, the density-raising element extends along a major part of the length of the cable.

According to one embodiment, said at least one density-raising element comprises a rod extending in the longitudinal direction of the cable. One advantage of using a rod is the compactness thereof, and the possibility of positioning such a rod in one or more longitudinal interstices between separate conductors/electric insulation elements in a plural-phase cable. Another advantage might be the possibility of providing a different density of the cable along a predetermined length thereof by letting one or more of a number of rod-shaped density-raising elements present a different extension line for said predetermined length. For example at least one rod may follow a helical extension line along said predetermined length, while following a straight extension line, with respect to the longitudinal axis of the cable, along neighbouring parts of the cable.

According to one embodiment, said at least one density-raising element is in contact with said protective sheath.

According to one embodiment, said at least one density-raising element comprises a tubular element arranged radially inside said protective sheath.

According to another embodiment, said at least one density-raising element comprises a tubular element arranged radially outside said protective sheath.

According to one embodiment, said at least one density-raising element and said protective sheath are coaxial.

According to one embodiment, the electric power cable comprises a plurality of parallel conductors, separated by electric insulation, wherein said at least one density-raising element extends in an interstice between such conductors.

According to one embodiment, said at least one density-raising element is embedded in said electric insulation.

According to one embodiment, said at least one density raising element comprises a tubular element, wherein said tubular element forms a sheath.

The object of the invention is also achieved by means of an off-shore installation comprising an electric power cable extending freely in the sea between two fixing points, characterised in that said electric power cable is an electric power cable according to the invention.

The invention also relates to a use of an electric power cable according to the invention in connection to an off-shore installation, wherein said cable is permitted to extend freely in the sea between two fixing points.

Further advantages and features of the present invention will be presented in the following detailed description as well as in the appended claims.

BRIEF DESCRIPTION OF THE DRAWINGS

Preferred embodiments of the present invention will now be described by way of example, with reference to the annexed drawings, on which:

FIG. 6 is a cross-section of a three-phase cable according to a further embodiment of the invention.

DETAILED DESCRIPTION OF THE INVENTION

Figure 1:
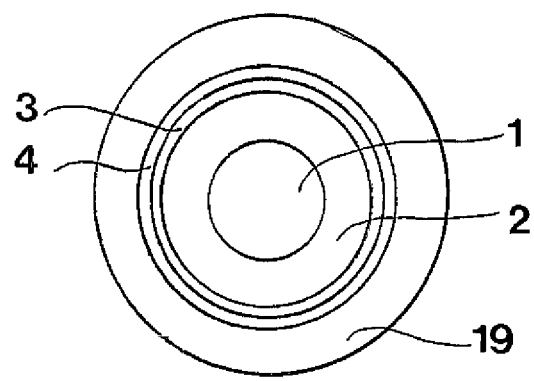
FIG. 1 is a cross section of a single-phase cable according to one embodiment of the invention.

FIG. 1 shows a first embodiment of a single phase electric power cable according to the invention. The cable comprises a conductor 1, preferably mainly constituted by a metal such as copper, surrounded by an electric insulation 2 mainly constituted by a polymer, as is common practice in prior art. The electric insulation 2 is, in its turn, enclosed by a surrounding protective sheath 3 that acts as a water barrier to prevent the intrusion of water, preferably also the steam phase thereof, into the electric insulation 2. This kind of water barrier 3 is required since the inherent properties of the electric insulation 2 are such that the latter would deteriorate and loose at least some of its insulation effect if subjected to water or water steam for a longer period.

Normally, the conductor 1 has a generally circular cross section, even though alternative shapes might be conceived. The surrounding electric insulation 2 has a cross-section with an outer peripheral shape corresponding to the outer peripheral shape of the conductor 1, normally a generally circular outer periphery. The protective sheath 3, which defines a tubular element has a generally cylindrical cross-section. In this context it should be noted that the insulation 2 is shown as directly attached to and in immediate contact with the conductor 1, and that the protective sheath 3 is shown as directly attached to and in immediate contact with the electric insulation 2 that it encloses. However, it should be understood that the invention is not primarily delimited to such designs, but that there may be further intermediate components provided in between said conductor, electric insulation and protective sheath of the inventive cable.

In the embodiment shown in FIG. 1 there is also provided a density-raising element 4 which is characterised in that it has a higher density than that of the protective shield 3 and also higher than the total density of the cable, i.e. the combination of the conductor 1, the insulation 2 and the protective sheath 3. By having an increasing effect on the total density of the cable, the density-raising element 4 contributes to the formation of a cable less prone to follow the motions of the sea when installed such that it extends freely in open sea. At the time being, lead is conceived by the applicant to be a preferred main constituent of the density-raising element 4.

The density-raising element 4 of FIG. 1 has a the shape of a tubular sheath that, as seen in a cross-section, encloses the protective sheath 3. the density-raising element 4 is directly attached to the outer peripheral surface of the protective sheath 3.

Figure 2:
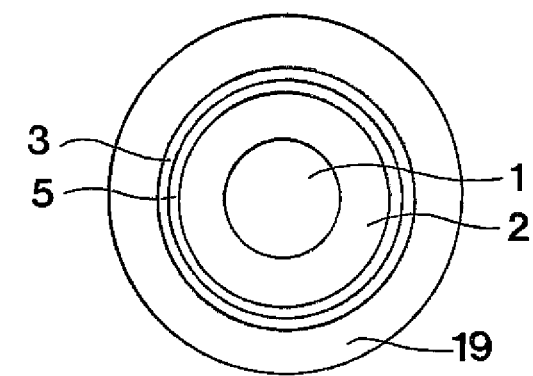
FIG. 2 is a cross-section of a single-phase cable according to an alternative embodiment of the invention.

FIG. 2 shows an alternative embodiment of a single-phase cable according to the invention, wherein the density-raising element 5 has the shape of a tubular sheath and wherein this embodiment differs from the one of FIG. 1 in that the density raising element 5 is in contact with and immediately attached to the inner peripheral surface of the protective sheath 3. Further, the density-raising element of this embodiment is immediately attached to the outer peripheral surface of the electric insulation 2 that surrounds the conductor 1.

Figure 3:
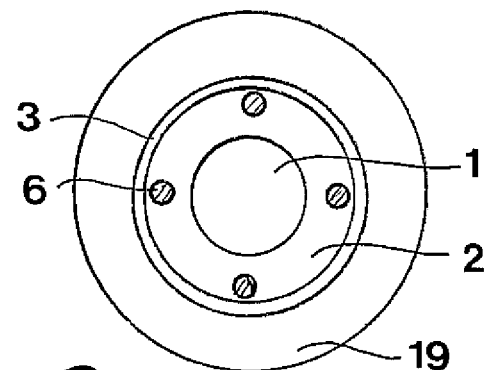
FIG. 3 is a cross-section of a single-phase cable according to another embodiment of the invention.

FIG. 3 shows yet another embodiment which comprises a plurality of density-raising elements 6 each of which has the shape of a rod 6 that is embedded in the electric insulation 2 and that extends in the longitudinal direction of the cable. Each rod 6 may either extend along a straight line with respect to the longitudinal axis of the cable or along any other given line, for example a helical line.

It should be understood that the conductor, insulation and sheaths described for the embodiments shown in FIGS. 1-3 normally are surrounded by further material or layers of material, indicated with 19 in FIGS. 1-3. Such further material and layers may have different tasks such as that of holding the different cable parts, as described above, together, and giving the cable mechanical strength and protection, against physical as well as chemical attack, e.g. corrosion, and are commonly known to the person skilled in the art. For example, such further material might include armouring, for example steel wires. The density-raising element of the invention may, as an alternative to what is shown in FIGS. 1-3 or a complement thereto, be provided in the mass of such further material 19, either as separate bodies or as a part of the functional elements of said further material or layers 19, for example as a part of an armouring wiring.

Figure 4:
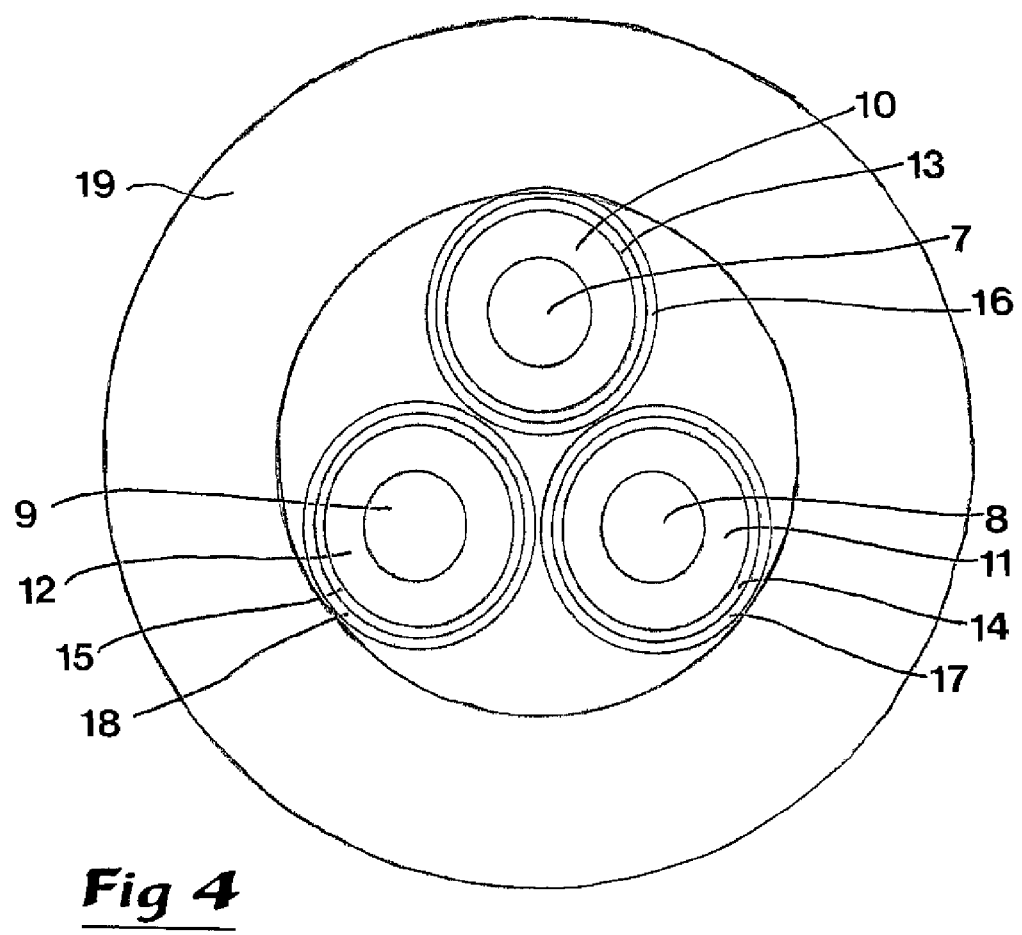
FIG. 4 is a cross-section of a three-phase cable according to one embodiment of the invention.

FIG. 4 shows a first embodiment of a three-phase cable according to the invention. Accordingly, the cable comprises three conductors 7-9, each of which is surrounded by and embedded in a separate body of electric insulation 10-12. Each body of electric insulation 10-12 is, in its turn, enclosed by a surrounding protective sheath 13-15 of the kind already discussed. Further, depending on the need of density-increase, at least one, or a majority, or all of theses bodies 10-12 with their associated protective sheath may be provided with at least one density-raising element in accordance with any one of the embodiments described above for the case of a single-phase cable. In the specific embodiment shown in FIG. 4, each of the protective bodies of electric insulation 10-12 is enclosed by an associated density-raising element 16-18 with the shape of a tubular sheath attached onto the outer peripheral surface of the respective protective sheath 13-15.

In the embodiment of FIG. 4, there is also indicted the presence of further material and layers 19 arranged around and enclosing the rest of the cable as described above. Such further material and layers 19 may have different tasks such as that of holding the different cable parts, as described above, together, and giving the cable mechanical strength and protection, against physical as well as chemical attack, e.g. corrosion, and are commonly known to the person skilled in the art. The invention does not exclude the possibility of having the density raising element arranged in connection to such further material. Instead of, or as a complement to, having separate density-raising elements arranged and associated to the individual phase components of conductors/insulations/protective sheaths, as suggested in FIG. 4, one or more density-raising elements may be arranged in said further mass of material or layers 19. Such a density-raising element may, for example, have the shape of a tube, for example a sheath, that surrounds all three phase components as described above, or a wire, preferably of higher density than armouring provided in such further mass of material. For example, a wire or a tube of lead or a lead-based alloy may be positioned adjacent to or in connection to such armouring made of, for example, steel, which is common practice within the present field of art. The above teaching is also applicable to the case of a one or two phase cable, as for example shown in the embodiments of FIGS. 1-3.

Figure 5:
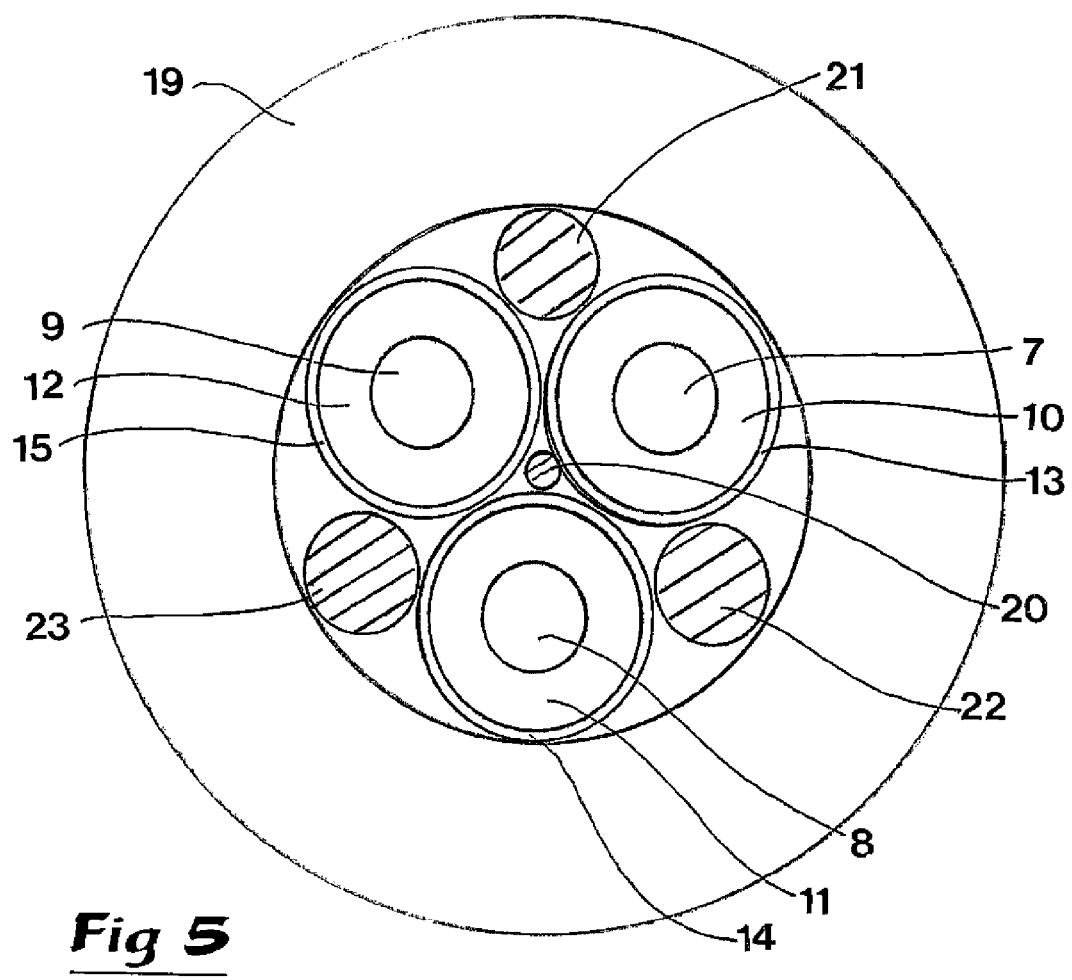
FIG. 5 is a cross-section of a three-phase cable according to an alternative embodiment of the invention.

In the embodiment of FIG. 5, the bodies of electric insulation 10-12 with their associated protective sheaths 13-15, are arranged in closest possible proximity to each other, thereby being in contact with one another along three lines in the longitudinal direction of the cable, and leaving a longitudinal interstice in a central position corresponding to the longitudinal central axis of the cable. Likewise to the embodiment shown in FIG. 4, there is also further material and layers 19 that surrounds the above-described phase components. Accordingly, since such layers 19 are, preferably, cylindrical as to their shape, there will be further longitudinal interstices between the phase components (7-18) and the closest surrounding layer 19. In the present cases of a three-phase cable, there will be three such further interstices. As indicated in FIG. 5, and depending on the need of density-increase, there will be provided one or more density-raising elements 20-23 in one or more of said interstices. Preferably such density-raising elements 20-23 are rod-shaped. They are held in place by the above-described phase components 7-18 and by the surrounding further material and layers 19.

Finally, FIG. 6 shows an embodiment in which the principles of the embodiments of FIGS. 4 and 5 are combined, thereby resulting in a further pronounced raising of the density of the cable.

It should be understood that the above description of preferred embodiments has been made in order exemplify the invention, and that alternative solutions will be obvious for a person skilled in the art, however without departing from the scope of the invention as defined in the appended claims supported by the description and the drawings.

The invention claimed is:

1. An electric power cable, comprising:
    at least one electric conductor,
    an electric insulation surrounding said conductor and comprising a polymer,
    a tubular protective sheath surrounding said electric insulation without unsealed seams and acting as a water barrier that prevents water intrusion into the electric insulation, wherein said protective sheath comprises a metal as a main constituent, wherein said protective sheath comprises copper or steel as main constituent, and
    at least one density-raising element of a material of higher density than the material of the protective sheath, in order to increase the density of said cable such that too large motions thereof are prevented when the latter is installed in open sea, wherein said at least one density-raising element comprises lead as a main constituent,
    wherein said at least one density-raising element comprises a rod extending in the longitudinal direction of the cable.

2. The electric power cable according to claim 1, wherein said at least one density-raising element comprises a tubular element.

3. The electric power cable according to claim 1, wherein said at least one density-raising element is in contact with said protective sheath.

4. The electric power cable according to claim 1, wherein said at least one density-raising element comprises a tubular element arranged radially outside said protective sheath.

5. The electric power cable according to claim 1, wherein said at least one density-raising element and said protective sheath are coaxial.

6. The electric power cable according to claim 1, wherein said at least one density raising element comprises a tubular element, and that said tubular element forms a sheath.

7. The electric power cable according to claim 1, wherein said at least one density-raising element extends along a major part of the length of the cable.

8. The electric power cable according to claim 1, wherein said at least one density-raising element is continuous in the longitudinal direction of the cable.

9. An electric power cable, comprising:
    at least one electric conductor,
    an electric insulation surrounding said conductor and comprising a polymer,
    a tubular protective sheath surrounding said electric insulation without unsealed seams and acting as a water barrier that prevents water intrusion into the electric insulation, wherein said protective sheath comprises a metal as a main constituent, wherein said protective sheath comprises copper or steel as main constituent, and
    at least one density-raising element of a material of higher density than the material of the protective sheath, in order to increase the density of said cable such that too large motions thereof are prevented when the latter is installed in open sea, wherein said at least one density-raising element comprises lead as a main constituent, wherein said at least one density-raising element comprises a tubular element arranged radially inside said protective sheath.

10. An electric power cable, comprising:

at least one electric conductor, an electric insulation surrounding said conductor and comprising a polymer, a tubular protective sheath surrounding said electric insulation without unsealed seams and acting as a water barrier that prevents water intrusion into the electric insulation, wherein said protective sheath comprises a metal as a main constituent, wherein said protective sheath comprises copper or steel as main constituent, and at least one density-raising element of a material of higher density than the material of the protective sheath, in order to increase the density of said cable such that too large motions thereof are prevented when the latter is installed in open sea, wherein said at least one density-raising element comprises lead as a main constituent wherein the electric power cable comprises a plurality of parallel conductors, each separated by electric insulation, and wherein said at least one density-raising element extends in an interstice between said insulated conductors.

11. An electric power cable, comprising:

at least one electric conductor, an electric insulation surrounding said conductor and comprising a polymer, a tubular protective sheath surrounding said electric insulation without unsealed seams and acting as a water barrier that prevents water intrusion into the electric insulation, wherein said protective sheath comprises a metal as a main constituent, wherein said protective sheath comprises copper or steel as main constituent, and at least one density-raising element of a material of higher density than the material of the protective sheath, in order to increase the density of said cable such that too large motions thereof are prevented when the latter is installed in open sea, wherein said at least one density-raising element comprises lead as a main constituent wherein said at least one density-raising element is at least partly embedded in said electric insulation.

* * * * *